United States Patent Office 3,443,425
Patented May 13, 1969

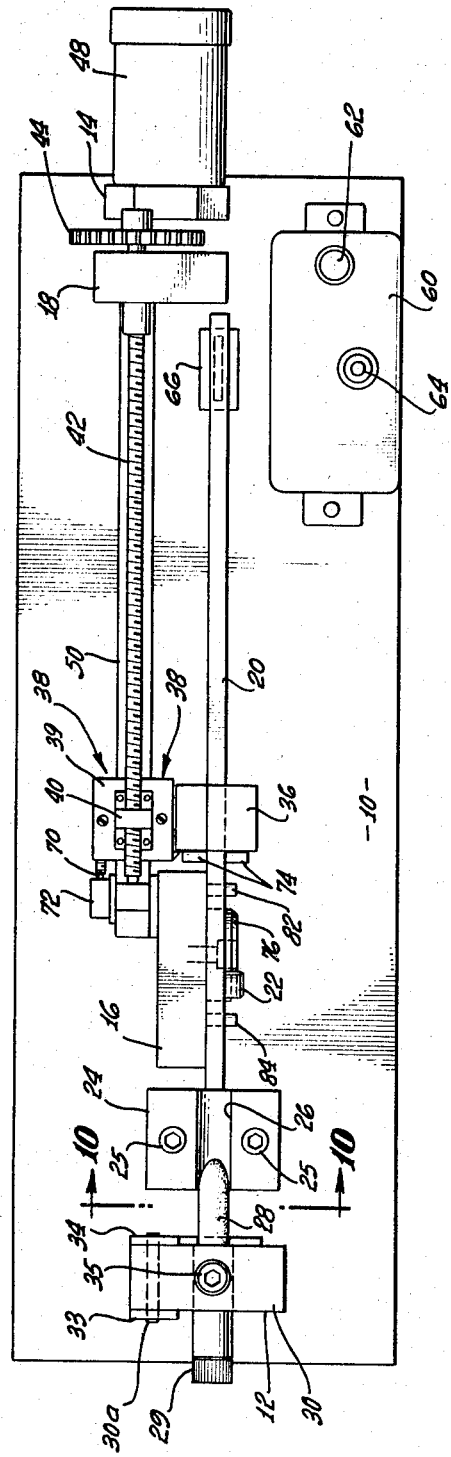
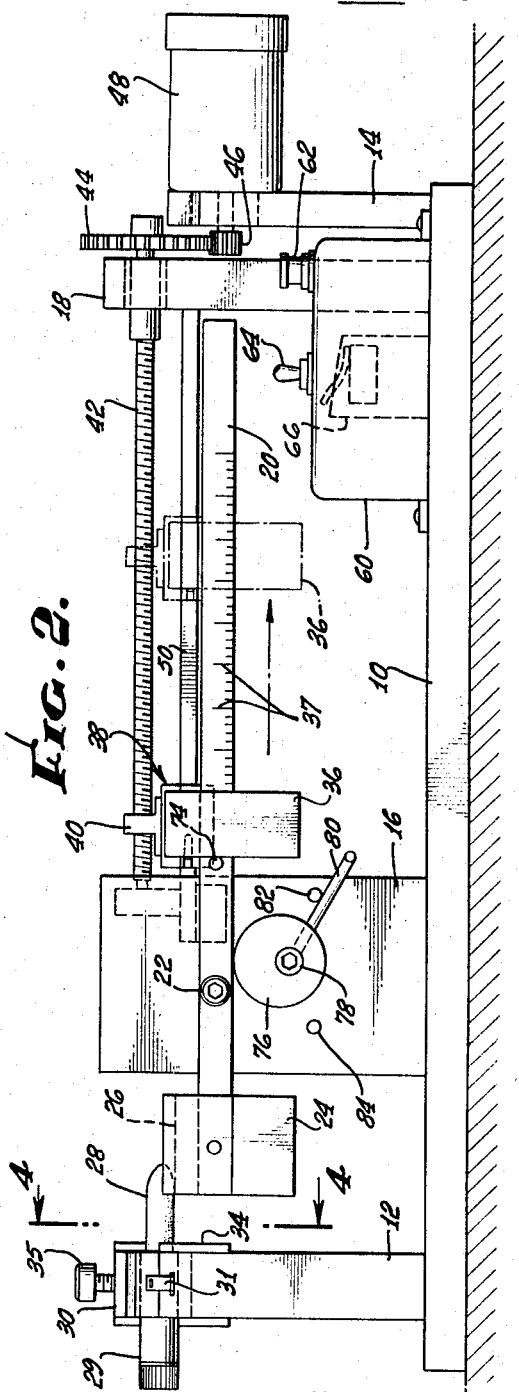

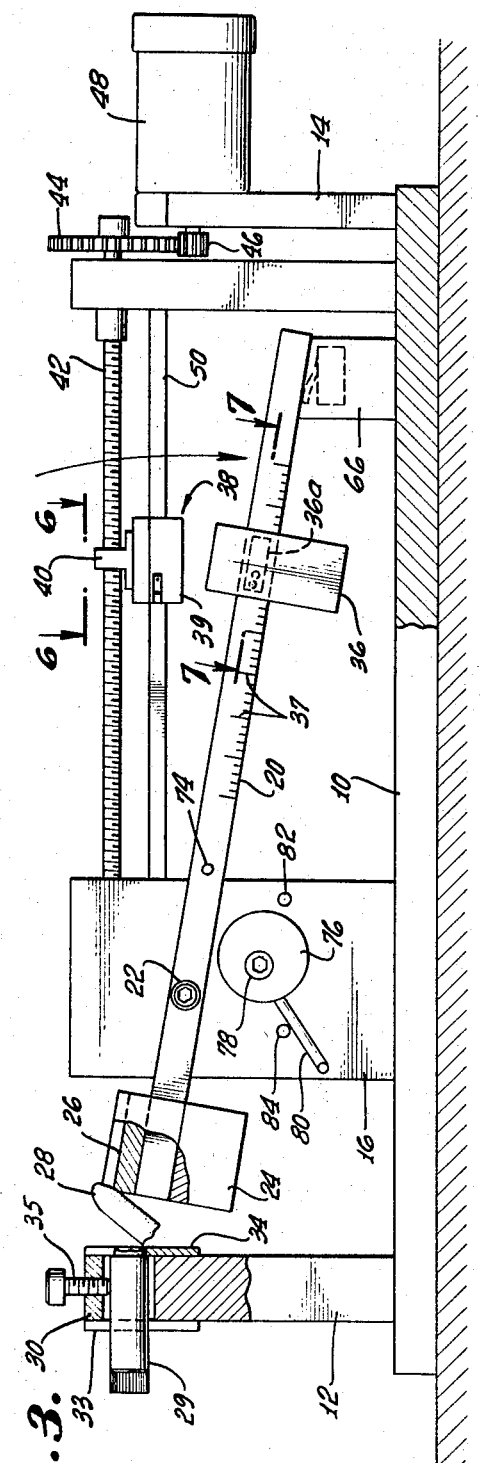

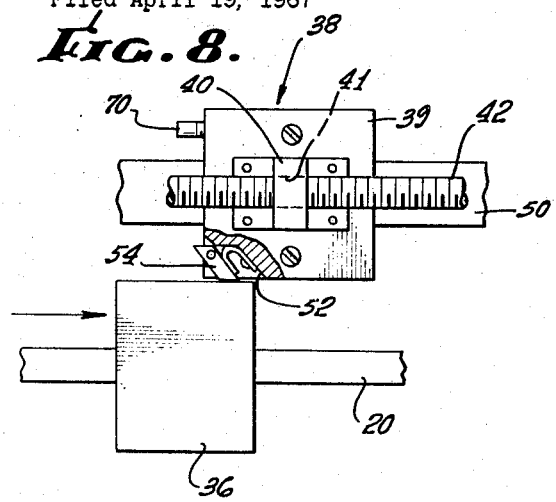
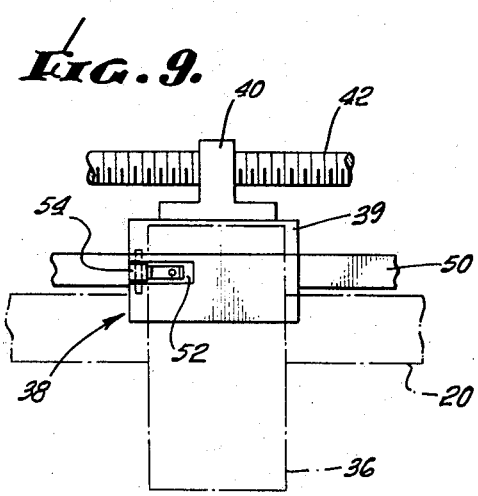
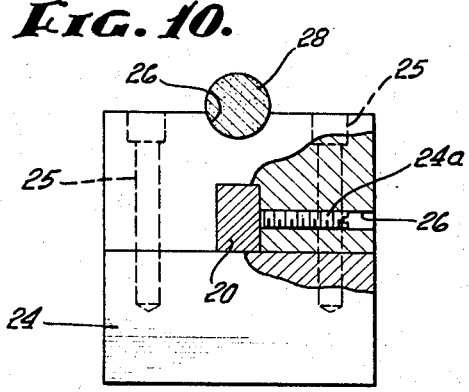
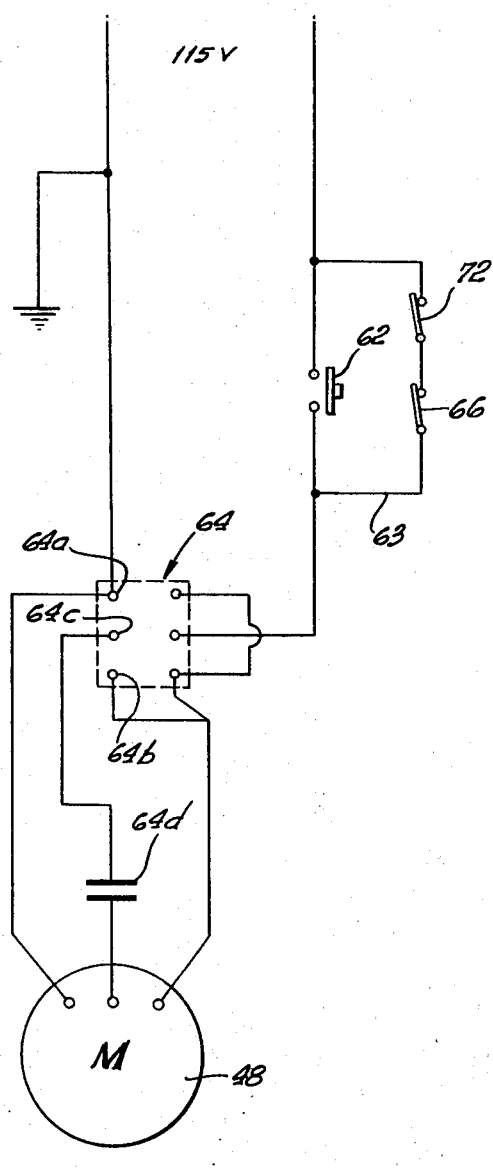
INVENTORS
WILLIAM H. HUNTER
GEORGE J. KENNEDY
By Huebner & Worrel
ATTORNEYS.

3,443,425
SHEAR TESTING MACHINE
William H. Hunter, Torrance, and George J. Kennedy, Granada Hills, Calif., assignors to Max Factor & Co., Hollywood, Calif., a corporation of Delaware
Filed Apr. 19, 1967, Ser. No. 632,005
Int. Cl. G01n 3/24
U.S. Cl. 73—101                                    5 Claims

ABSTRACT OF THE DISCLOSURE

A mechanized apparatus especially adapted to test the shear strength of different materials, such as lipstick which includes a counterbalanced lever having, at one end, a shear block which bears against the material being tested and remote from the block a slidable counterweight movable over a graduated scale. When the slidable counterweight is moved to a position which causes pressure on the shear block to break the material a precise indication is provided on the graduated scale of the relative shear strength of the material.

BACKGROUND OF THE INVENTION

This invention relates to a machine adapted to test the shear strength of different materials.

In particular, the machine is suited for use in testing the shear strength of soft material articles such as lipstick. The quantities and types of ingredients which go into the manufacture of lipsticks vary depending upon stability, textures and formulas. Thus changes of quantity or types of ingredients will vary the brittleness or shear of a lipstick. It is therefore desirable to test the shear force so that an acceptable shear force is maintained.

Heretofore, the testing of shear strength of lipstick has been cumbersome with no degree of real accuracy. Water devices have been used primarily wherein a slidable beaker is filled manually with water and it moves down a slide until it hits and breaks the lipstick. With such devices it has been difficult to control the stream of water so as to obtain accurate as well as uniform results.

Thus, an accurate, fast and efficient shear testing machine for these types of materials is not ordinarily available.

SUMMARY OF THE INVENTION

Therefore, it is a primary object of this invention to provide a shear testing machine which will precisely measure the shear strength of soft material items such as lipstick.

Furthermore, it is an object of this invention to provide a machine adapted for testing the shear strength of lipstick which is substantially automated and efficient to operate.

A shear testing machine in accordance with this invention which is especially adapted for testing lipstick includes a counterbalanced lever which carries a shearing block at one end and a counterweight slidably mounted on a graduated scale portion of the lever on the other end. The shearing block abuts the bottom of the lipstick to be tested when the lever is balanced level so that as the counterweight is slid outwardly toward the opposite end a lifting pressure gradually increases on the lipstick until it breaks. At this point of breakage the relative shear strength of the lipstick is indicated by the position of the counterweight on the graduated scale portion of the lever. The movement of the counterweight on the lever is controlled by a mechanized guide means detachably coupled thereto. When the lipstick being tested breaks the shear block lifts and the counterweight drops, which correspondingly causes the adjacent end of the lever to actuate a stop switch to disconnect the motor drive for the guide means. The machine is reset for testing by moving the counterweight back to a level, balanced position and recoupling the guide means thereto.

BRIEF DESCRIPTION OF THE DRAWINGS

FIGURE 1 is a top plan view of a preferred embodiment of a shear testing machine in accordance with this invention.

FIGURE 2 is a side elevational view of the machine shown in FIGURE 1 loaded for testing.

FIGURE 3 is a side elevational view of the machine as shown in FIGURE 2 at the completion of a testing operation.

FIGURE 4 is an elevational, partly cross-sectional view of the material holder portion of the machine taken through line 4—4 in FIGURE 2.

FIGURE 5 is a longitudinally sectioned view of the material holder taken through 5—5 in FIGURE 4.

FIGURE 6 is a fragmented top plan view of the movable scale guide and associated components taken through 6—6 in FIGURE 3.

FIGURE 7 is a sectional view of the movable scale counterweight taken through 7—7 in FIGURE 3.

FIGURE 8 is an enlarged top plan view of the scale counterweight and scale guide when coupled together.

FIGURE 9 is an elevational view of the scale counterweight in phantom lines and scale guide when coupled together as in FIGURE 8.

FIGURE 10 is a partly sectioned end elevational view of the shearing block and material taken through 10—10 in FIGURE 1.

FIGURE 11 is a schematic view of a circuit suitable for operating a shear testing machine as illustrated.

DESCRIPTION OF THE PREFERRED EMBODIMENT

A shear testing machine in accordance with this invention as shown in the drawings is particularly well adapted for testing the shear strength of lipstick. Briefly, the machine includes a horizontally disposed, rectangular shaped, flat, base platform 10 which supports, at opposite ends, an upright lipstick support post 12 and an upright motor support post 14. Rising vertically from base platform 10 between posts 12 and 14 are spaced longitudinally from each other relative to base platform 10 are an intermediate fulcrum block 16 and a scale support post 18, the latter of which is adjacent to post 14.

An elongated lever 20 is pivotally supported from an intermediate portion thereof by a fulcrum bolt 22 which laterally projects from the side of fulcrum block 16 somewhat above the top surface of platform 10. Lever 20 is mounted so that its opposite ends extend toward posts 16 and 18, respectively, which are longitudinally spaced from each other greater than the length of lever 20. Thus, lever 20 can pivot freely between them.

A weighted shearing block 24 is mounted on the end of lever 20 nearest post 12. This block 24 is formed with a concave longitudinally extending lipstick engaging groove 26 provided in its central top surface. Groove 26 is adapted to bear against a conventional cylindrically-shaped lipstick 28 being tested for shear strength. As shown in FIGURE 10 block 24 is preferably comprised of two horizontally split parts bolted together by bolts 25 around an end of lever 20 mounted in a complementarily shaped rectangular opening therein. An adjustable setscrew 24a is threadably engaged within a bore 26 laterally extending through block 24 so as to bear against lever 20 and secure block 24 in position.

The lipstick 28 which is to be tested for shear strength is carried in a retractor tube 29. During testing the tube 29 is held in position by a hinged lipstick holder or clamp 30 pivotally mounted on the top of post 12 as best viewed in FIGURES 4 and 5. The holder 30 is secured in closed position against post 12 by a lock 31 attached thereto opposite its pivotally connected side. It is provided with a longitudinally aligned triangular notch 32a cut in its bottom surface. This notch 32a mates with a complementary, longitudinally aligned triangular notch 32b formed in the top surface of post 12. The diamond-shaped opening formed by notches 32a and 32b when holder 30 is closed has opposite sides spaced approximately the same distance as the diameter of the retractor tube 29 of a lipstick 28 to be tested by the machine. A hinge pin 30a extends laterally between and is supported by opposing raised portions of plates 33 and 34 which are secured to the opposite upper sides of post 12. Pin 30a provides the pivotally mounted support for holder 30 through which it laterally extends within a mating hole. An extended portion of plate 34 has an upper edge flush with the upper edge of post 12 and a curved support recess 34a substantially conforming to the circumferential periphery of a lipstick and in alignment with notch 32b.

Thus, with the holder 30 in open position as in the dotted lines of FIGURE 4 a lipstick 28 in a retractor tube 29 to be tested is laid in notch 32b in horizontal longitudinal alignment with the long axis of the machine. A portion of the end of the lipstick 28 about equal to that which would be extended in ordinary use projects from the retractor tube 29 toward post 16 so as to simulate usage shear pressure.

When holder 30 is closed the sides of notch 32a press down and bear against the retractor tube 29. To firmly secure the lipstick tube 29 in position an adjusting screw 35 is threadably mounted in a bore extending vertically through holder 30 from the top surface thereof to its bottom surface, and bears against the upper surface of tube 29. When thus secured the relative position of the notches 32a and 32b and the counterbalance shearing block 24 are such that when the lever 20 is horizontal the protruding end of lipstick 28 will rest in the groove 26 on the top surface of block 24 as best viewed in FIGURE 2. The inner portion of the lipstick 28 bears against curved support recess 34a at which position a substantially diametrical fracture will occur when the lipstick is subjected to lateral pressure during testing.

The portion of lever 20 remote from the attachment of shearing block 24, and on the opposite side of fulcrum bolt 22, is marked with vertical, longitudinally spaced lines 37 of a graduated measuring scale and carries a longitudinally slidable scale counterweight 36, the free movement of which is tension biased by a small leaf spring 36a best seen in FIGURE 7, attached thereto to bear tightly against the side of lever 20. The scale counterweight 36 substantially balances the shearing block 24 to hold lever 20 horizontal when slid adjacent to fulcrum block 16 as in FIGURE 2. However, as the scale counterweight 36 is slid away from fulcrum block 16 the balance is shifted on lever 20 so that a gradually increasing lifting pressure is created on shearing block 24. When a lipstick 28 is resting in the groove 26 of shearing block 24 this lifting pressure is resisted until the shear strength limit of the lipstick 28 is reached at which point the lipstick breaks as shown in FIGURE 3.

Hence, the amount of pressure required to break the lipstick 28 is controlled by the weighted leverage of counterweight 36. In turn, the position of counterweight 36 when the lipstick breaks indicates the relative shear strength of various lipsticks being tested. Since lever 20 is provided with a calibrated measuring scale 37 on the portion thereof over which counterweight 36 slides the comparative shear strength of various lipsticks may be quickly and precisely determined.

In order to control the longitudinal movement of counterweight 36 a scale guide means 38 is detachably coupled thereto. This scale guide 38 includes a rectangular block 39, to which is secured on the top surface thereof, a coupling 40 formed with a horizontal, internally threaded bore 41 extending longitudinally therethrough which mates with an externally threaded, horizontally positioned, feed screw 42 upon which it is carried. This feed screw 42 is rotatably supported in suitable bearings (not shown) longitudinally between fulcrum block 16 and scale support post 18 parallel with and adjacent to the graduated scale portion of lever 20 so that scale guide means 38 is closed enough to scale counterweight 36 to become coupled thereto.

Scale guide means 38 are moved longitudinally by rotation of screw feed 42 which, through engagement with coupling 40, correspondingly moves counterweight 36. An extended portion of screw feed 42 projects through its bearing support within post 18 to form the center shaft upon which circular reduction gear 44 is mounted. Gear 44, in turn, engages a small circular drive gear 46 which is coupled to and rotated by an electric motor 48 mounted on post 14. To prevent scale guide means 38 from swinging laterally a guide bar 50 is supported longitudinally between fulcrum block 16 and post 18 parallel with screw feed 42 and close enough to scale guide means 38 to become slidably engaged with a complementary, longitudinally slotted, center bottom portion of block 39.

To couple scale guide means 38 and counterweight 36 together a releasable coupling means in the form of a recessed slot 52 is formed in the side of block 39 adjacent to counterweight 36. The slot 52 is so disposed that a resiliently mounted engaging latch 54 protruding therefrom is adjacent to counterweight 36 and can engage the side of counterweight 36 nearest fulcrum block 16 for horizontal longitudinal movement as the block 39 moves away from block 16. However, the latch 54 becomes detached from engagement with counterweight 36 when it drops down as shown in FIGURE 3. The resilient mounting of latch 54 permits it to be depressed substantially flush with the side of scale guide means 38 as in FIGURE 8 to facilitate coupling with counterweight 36 as in FIGURE 6.

The operation of the motor 48, which is preferably of the capacitor reversible type, is controlled by suitable electrical circuitry, such as shown in FIGURE 8. The primary controls for this motor 48 are mounted in a switch box 60 mounted on platform 10. To energize this electrical circuit, which is powered by a conventional 115 volt AC input, a resiliently mounted normally open start switch 62, mounted in the top of switch box 60, is pushed. This closes a parallel circuit 63 to the power supply. Then, in order to rotate feed screw 42 through gears 44 and 46 a toggle switch 64, also mounted in the top of switch box 60, is actuated. To move scale guide means 38 forward and away from fulcrum block 16 toggle switch 64 is snapped forward from its vertical "neutral" position 64a to a "test" position 64b and to reverse the direction of movement toggle switch 64 is snapped to a rear "reset" position 64c. Each of these positions of the toggle switch 64 are indicated in FIGURE 11 by showing which circuits are correspondingly opened and closed from the power supply. Preferably a one microfarad 500 volt capacitor 64d is normally carried in the rest position circuit 64c to motor 48.

The forward movement of scale guide means 38 is automatically stopped when scale weight 36, normally coupled thereto, becomes detached due to the offsetting weight balance created when the lipstick breaks. This offsetting will pivot the adjacent end of lever 20 to drop down as shown in FIGURE 3 so as to depress a normally closed test stop switch 66 which is resiliently mounted therebelow on platform 10. That is, test stop switch 66 opens the parallel circuit 63 around start switch 62 to the power supply controlling motor 48 so that it is turned off when switch 66 is depressed. When the end of lever 20 is lifted stop switch 66 moves back to its closed position.

When resetting the machine for further testing toggle switch 64 is snapped back to its reset position thereby reversing motor 48 by closing the circuit 64c and causing scale guide means 38 to move toward fulcrum block 16. As scale guide means 38 comes near fulcrum block 16 it is automatically stopped by the contact of a button 70 projecting from the adjacent wall of block 39 with a mating resiliently mounted release button of a stop switch 72 attached to the side of fulcrum block 16. That is, the switch 72 is also connected by suitable circuitry parallel with start switch 62 which opens the power circuit so as to turn off motor 48 when it is actuated and closes the circuit when it is released.

A pair of stops 74 protrude laterally from both sides of the lever 20 adjacent to fulcrum block 16 to limit the lateral movement of scale weight 36 thereon. While the machine is being set up for a testing operation the lever 20 is held level and locked against pivoting by a circular cam lock means 76 rotatably mounted on an eccentrically disposed pivot pin 78 extending from the side of fulcrum block 16 below lever 20. Locking cam 76 is provided with a radially extending control arm 80 which, when turned to abut against a forward stop pin 82 projecting from block 16, raises the locking cam 76 so that its upper peripheral surface abuttingly lifts and supports lever 20 in a level locked position as shown in FIGURE 2. When testing is to be started control arm 80 is rotated back until it bears against a rear stop pin 84 protruding from the side of fulcrum block 16 so as to release lever 20 by lowering the cam 76 as shown in FIGURE 3.

In operation, the locking cam 76 is rotated forward until its arm 80 bears against forward stop 82 thereby supporting lever 20 substantially horizontally. The start switch 62 is pressed to energize the electrical circuit. Counterweight 36 and scale guide means 38 are coupled together and moved back adjacent to fulcrum block 16 if not already in that position. A lipstick tube 29 and lipstick 28 are mounted horizontally on post 12 and secured by holder 30 so that a normally extended portion of the lipstick rests in the groove 26 of shearing block 24. The locking cam 76 is released by turning it until its arm 80 bears against rear stop pin 84. Then scale guide means 38 and coupled scale weight 36 are moved forward in unison by snapping toggle switch 64 into its test position.

When the amount of force on the graduated scale portion of lever 20 caused by the leveraged pressure of scale counterweight 36 is greater than the shear strength of the lipstick 28 it breaks thereby causing the graduated scale portion of lever 20 to drop and its adjacent end to press against switch 66 to shut off the driving motor 48. The precise location of the scale counterweight 36 at the time of the lipstick fracture can thus be readily measured on the adjacent measuring scale 37 on the lever. When repeating this test by resetting the machine all the operative conditions are duplicated so that an accurate, calibrated comparison can readily be made between different lipsticks or other similar articles to determine their shear strength.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent structures and devices.

We claim:
1. A testing machine adapted to physically shear an article and calibrate the force required to so shear comprising a freely pivoted lever, said lever at one end including a shear block to engage said material, and a shiftable counterweight on a portion of said lever remote from said shear block whereby the shifting of said counterweight will move said shear block about said pivot, a holder means adapted to receive and maintain said material in contact with said shear block, said shear block adapted to apply tangential shear force against said material whereby said material will break, calibration means associated with said lever to register said tangential shear force of said shear block, wherein motor drive guide means are associated with said counterweight to shiftably move said counterweight on said lever, wherein said counterweight and said motor guide means are normally releasably coupled together but become detached when the article being tested breaks and resistance to the tangential shear force of said shear block is released, and a stop means disposed so that it is actuated to stop said motor when contacted by the end of the lever remote from said shear block after the release of said resistance.

2. A testing machine as defined in claim 1 wherein said motor guide means includes a motor driven rotatable feed gear which is longitudinally parallel with and adjacent to said lever and a movable guide mounted thereon and said counterweight becomes detached from said movable guide by swinging downwardly therefrom as its leveraged pressure exceeds the upward tangential shear force applied to said article being tested which breaks upwardly as force is applied by said shear block.

3. A testing machine as defined in claim 2 wherein said counterweight engaging said lever includes motion arresting means whereby it will remain releasably stationary when it is detached from said motor guide means.

4. A shear testing machine comprising: a base platform; a centrally mounted fulcrum block supported by said base platform; a lever pivotally secured to said fulcrum block sufficiently above said platform to allow free swinging movement thereof; a shear block secured to one end of said lever; a counterweight slidably supported on a calibrated scale portion of said lever remote from said shear block; a material holder mounted adjacent the shear block on said lever and adapted to securely hold an article to be tested in abutting engagement with the top surface of said shear block when said lever is in a balanced horizontal position; a rotatably mounted, elongated, threaded screw supported parallel to and near the calibrated scale portion of said lever; a guide threadably engaged with and supported by said screw and releasably coupled to said counterweight for longitudinal movement along said lever; a drive means for rotating said threaded screw to longitudinally move said scale guide and counterweight when coupled thereto and switch means for controlling said drive means.

5. A shear testing machine as defined in claim 4 which includes a releasable cam locking means on said fulcrum block adapted to lock said lever in said balanced horizontal position when said machine is not in use.

References Cited

FOREIGN PATENTS 129,422 7/1919 Great Britain.
1,071,375 12/1959 Germany.

RICHARD C. QUEISSER, Primary Examiner.
J. WHALEN, Assistant Examiner.

U.S. Cl. X.R.
73—87